United States Patent
Tuokkola et al.

(10) Patent No.: US 6,301,347 B1
(45) Date of Patent: Oct. 9, 2001

(54) PROCEDURE FOR THE TRANSMISSION OF INFORMATION IN A TELEPHONE NETWORK

(75) Inventors: Hannu Tuokkola, deceased, late of Espoo, by Mauno Tuokkola, Aila Tuokkola legal representatives; Teuvo Koponen, Oulu, both of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/409,116

(22) Filed: Sep. 30, 1999

Related U.S. Application Data

(63) Continuation of application No. PCT/FI98/00358, filed on Apr. 22, 1998.

(30) Foreign Application Priority Data

Apr. 22, 1997 (FI) .......................................... 971716

(51) Int. Cl.⁷ .............................. H04M 3/42; H04M 7/00; H04L 12/16; H04J 1/14; H04J 3/12
(52) U.S. Cl. .......................... 379/201; 370/259; 370/384; 370/524; 379/230
(58) Field of Search .................................. 379/201, 207, 379/219, 220, 230; 370/351, 352, 524, 259, 384; 455/403, 422, 466

(56) References Cited

U.S. PATENT DOCUMENTS

| | | | |
|---|---|---|---|
| 5,351,235 | * | 9/1994 | Lahtinen ................................ 370/259 |
| 5,579,314 | * | 11/1996 | Jones ..................................... 370/384 |
| 5,915,222 | * | 6/1999 | Olsson et al. .......................... 455/466 |
| 6,052,369 | * | 4/2000 | Hamalainen et al. ................. 370/389 |

FOREIGN PATENT DOCUMENTS

| | | |
|---|---|---|
| 94581 | 8/1992 | (FI) . |
| 2 289 190 | 11/1995 | (GB) . |
| 92/14329 | 8/1992 | (WO) . |
| 94/02124 | 2/1994 | (WO) . |
| 94/05124 | 3/1994 | (WO) . |
| 96/42175 | 12/1996 | (WO) . |
| 97/36434 | 10/1997 | (WO) . |

OTHER PUBLICATIONS

"The GSM System for Mobile Communications" Michel, et al. pp. 59–59, 556–563.

* cited by examiner

Primary Examiner—Harry S. Hong
(74) Attorney, Agent, or Firm—Altera Law Group, LLC

(57) ABSTRACT

The present invention relates to a procedure for transmitting information to a predetermined subscriber line or predetermined subscriber lines in a telephone network. In the procedure of the invention for transmitting information to a predetermined subscriber line in a telephone network, which comprises a telephone exchange (1), a number of subscriber lines (2) connected to it and a terminal device (3) connected to the subscriber line, the subscriber number of the subscriber line acting as source of information is stored in the telephone network; the subscriber numbers of the predetermined subscriber lines to which the information is to be transmitted are stored in the telephone network; the information to be transmitted is stored in the telephone network and/or in a peripheral connected to it; and, using a link without actual connection, the predetermined information is transmitted of the predetermined subscriber lines.

10 Claims, 1 Drawing Sheet

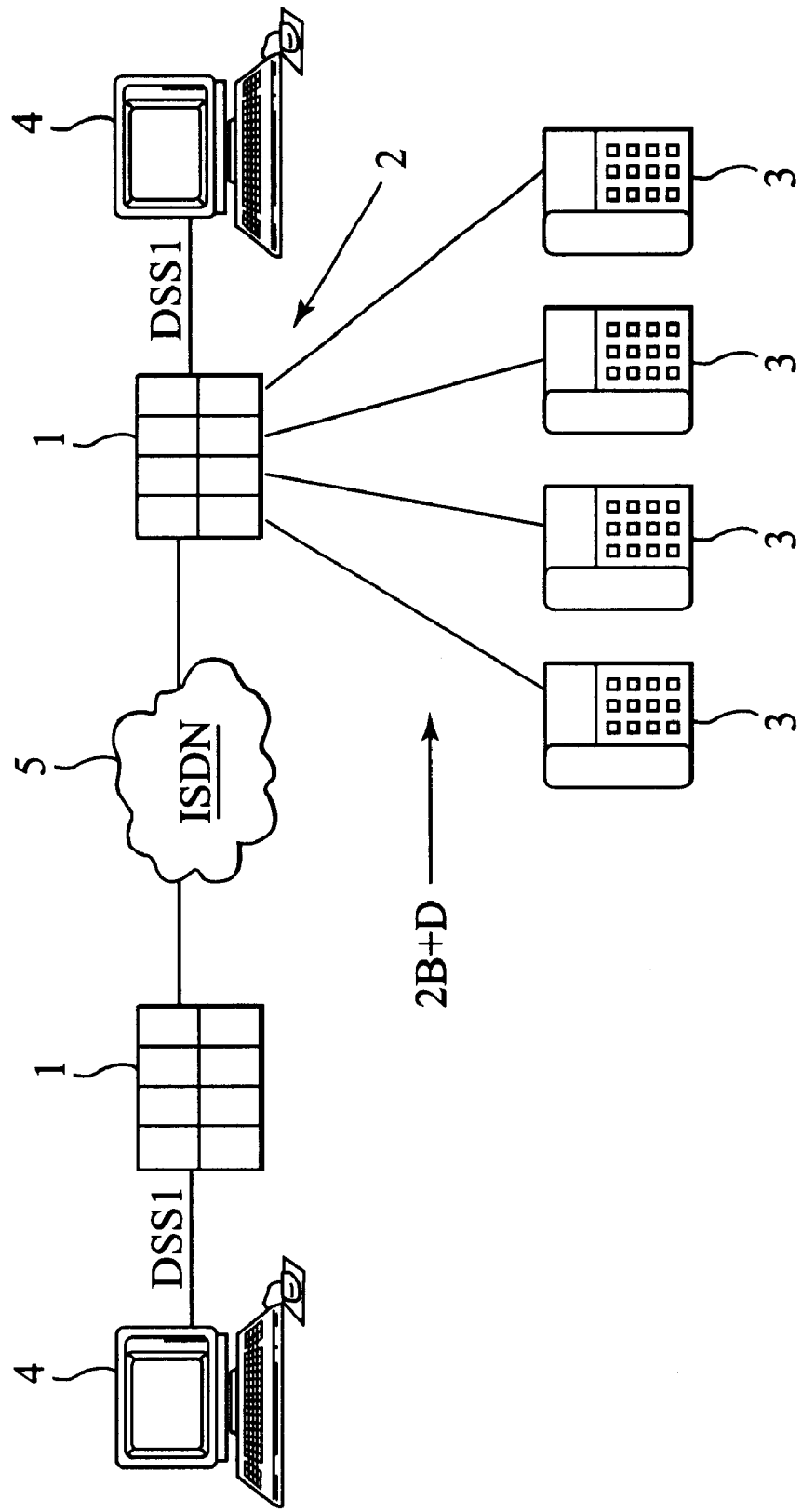

PROCEDURE FOR THE TRANSMISSION OF INFORMATION IN A TELEPHONE NETWORK

This is a continuation of PCT/FI98/00358 filed Apr. 22, 1998.

FIELD OF THE INVENTION

The present invention relates to a procedure for transmitting information to a predetermined subscriber line or predetermined subscriber lines in a telephone network.

DESCRIPTION OF RELATED ART

Transmission on information over a telephone network is widely known. In prior art, information can be transmitted between two predetermined subscriber lines using computers and modems connected to them. However, such a procedure requires the setup of a connection between the subscriber lines in question. On the other hand, it is also possible to transmit information between subscriber lines by setting up a speech connection between the subscriber lines and using this connection for the transmission of information.

In prior art, no system is known that allows transmission of information to a terminal device that only acts as a passive receiving party, without signaling sent by both parties. At present, however, there is a need for transmission of information independently of the receiver's actions. This means transmitting information by a method in which the information provider activates the transmission without the receiver's acknowledgement. The information or data to be transmitted may consist of commercial advertising information, various performance data service type information or the teleoperator's own advertisements or announcements. Via this arrangement, advertising, marketing and similar information can be directed at given target groups, based e.g. on subscriber location, which can be determined from the subscriber numbers, or on some other corresponding basis. However, the problem is that no such arrangement is known.

SUMMARY OF THE INVENTION

The object of the present invention is to disclose a new type of procedure that makes it possible to fulfill the above-mentioned need for data transmission in a telephone network independently of the receiver's actions. A further object of the invention is to create an arrangement that allows a teleoperator to provide the connections between an information provider and the target subscriber lines.

In the procedure of the present invention for transmitting information to a predetermined subscriber line in a telephone network, which comprises a telephone exchange, a number of subscriber lines connected to the telephone exchange and a terminal device connected to the subscriber line, according to the invention, the subscriber number of the subscriber line acting as a source of information is stored in the telephone network, the subscriber numbers of the subscriber lines to which the information is to be transmitted are stored in the telephone network and, further, according to the invention, the information to be transmitted is stored in the telephone network and/or in a peripheral connected to it and, using a link without actual connection, the predetermined information is transmitted to the predetermined subscriber lines. Thus, when the transmission of information is activated, the information to be transmitted and the predetermined subscriber numbers to which the information is to be transmitted are read from the subscriber line acting as source of information, which subscriber line may have e.g. a computer connected to it, and the information is transmitted in suitable information elements of the signalling used in the telephone network.

As compared with prior art, the present invention has the advantage that the procedure of the invention allows transmission of information to certain subscriber lines without requiring any actions to be carried out at the receiving end. Further, the invention allows information providers to offer their services to their customers without setting up connections between the terminals, which increase the load on the telephone network, while still using telephone network signalling.

The signalling used in the telephone network is preferably ISDN signalling (ISDN, Integrated Services Digital Network), such as ISUP signalling (ISUP, ISDN User Part). In this case, the information to be transmitted can be transferred to the desired subscriber line in the DISPLAY element of the FACILITY message used in ISDN signalling. The transmission can be performed when the subscriber line is in inactive state, in call setup state or in active state. Thus, the transmission can be carried out completely independently of the subscriber line, i.e. the subscriber line is not required to acknowledge the information transmitted or to react to it in any other way.

In an embodiment of the invention, a computer is connected to a predetermined subscriber line in the telephone network and the subscriber numbers to which the information is to be transmitted as well as the information itself are stored in the computer, and the computer is used to control the transmission of the information to the subscriber lines in question. This implementation has the advantage that the service provider can easily change both the content of the information to be transmitted and the subscriber lines forming the target group.

The subscriber number of the subscriber line acting as data source, as well other information needed, such as the predetermined subscriber numbers to which the data is to be transmitted, can be transferred over the telephone network in the information elements of the SETUP message used in ISDN signalling. On the other hand, the information in question can be stored and transmitted by using the telephone exchange's own control commands, preferably nM7 commands (MML, Man Machine Language)

In a preferred embodiment of the invention, the transmission of information is activated a. predetermned intervals of time. The time interval can be defined e.g. in a computer connected to the telephone network or to some other network component controlling data transmission. The information is preferably presented in graphic and/or text format on the display of the terminal device or in the form of sound via a loudspeaker connected to the terminal device.

BRIEF DESCRIPTION OF THE DRAWINGS

In the following, a preferred embodiment of the invention will be described by referring to the attached drawing, which presents an arrangement according to the invention, implemented in an ISDN telephone network.

DETAILED DESCRIPTION OF THE INVENTION

The system presented in the drawing comprises a multi-service ISDN network 5, two telephone exchanges 1 connected to it and workstations 4 connected to the telephone exchanges. Let it be further stated that the ISDN network as such may comprise other telephone exchanges not presented in this context. The signalling between the telephone exchange 1 and the workstation 4 is implemented using DSS1 signalling (DSS1, Digital Signalling System #1), which is a wellknown signalling system. The system presented in FIG. 1 further comprises terminal devices 3, which in this example are ISDN terminals. The terminal device 3 may be either an ordinary telephone or it may be an ISDN service switch or some other device capable of ISDN signalling. In the present example, the terminal devices are telephones and they are connected to subscriber lines 2 in the telephone exchange 1 using the basic ISDN line (2B+D)

Next, an example will be presented to describe how the procedure of the invention is implemented in the system represented by the figure. The information or service provider can activate the service by calling a steciuic service number, which has been defined in the telephone exchange. The information can be supplied either directly from a subscriber line connected to the exchange or by using ISDN signalling (TSUP) . When calling the service number, the information or service provider gives the following parameters in different information elements of the SETUP message: service number (virtual number of the subscriber line to which the call is routed), the information to be transmitted (information to be distributed among users) and the subscriber number(s) to which the information is to be transmitted. In an embodiment, the information is transmitted in DSS1 signaling as follows:

Information elements of a DSS1 SETUP message:

Called Party Number Information Element: IDS service number (max. 20 characters)

User to User Information Element: the information to be transmitted, IA 5 characters (max 128 bytes)

Called Party Subadress Information Element: the first ISDN number to which information is to be transmitted (max 20 characters) Calling Party Subadress Information Element: the last ISDN number to which information is to be transmitted (max 20 characters).

It is to be noted that the above-described definition and distribution of information can also be implemented as an internal function within the exchange using e.g. a MML user interface, in which case no information distribution equipment like that described above will be needed.

Further, the distribution of the information is carried out from the exchange in which the service number has been implemented. Using a link without actual connection, transmission of information is set up from the exchange to the ISDN numbers obtained in conjunction with activation. This is done without setting up a call between the subscriber lines. The transmission can be effected while the subscriber line is in inactive state, in call setup state or in active state. In DSS1 signalling, the information can be transmitted e.g. as follows:

Called Party Number Information Element: ISDN number to which the information is to be transmitted (max. 80 characters), Display Information Element: information to be transmitted, IA 5 characters (max. 80 bytes)

The invention is not restricted to the examples of its embodiments described above, but many variations are possible within the scope of the inventive idea defined by the claims.

What is claimed is:

1. Method for transmitting information to a predetermined subscriber line in a telephone network which comprises:

providing a telephone exchange, a number of subscriber lines connected to the telephone exchange and a terminal device connected to subscriber lines, in which method using a link without an actual connection to the subscriber lines, information is transmitted from an information distribution service to predetermined subscriber lines;

storing subscriber numbers of the predetermined subscriber lines to which the information is to be transmitted in connection with the information distribution service; and activating the information distribution service by receiving a call to a predetermined service number at the telephone exchange, the telephone exchange acting as source for the predetermined subscriber lines.

2. Method as defined in claim 1, wherein ISDN signalling, such as ISUP signalling, is used in the telephone network.

3. Method as defined in claim 1, wherein the information is transmitted to the predetermined subscriber line when the latter is in inactive state, in call setup state or in active state.

4. Method as defined in claim 1, wherein the information is transmitted to the subscriber line in a DISPLAY information element of a FACILITY message used in ISDN signalling.

5. Method as defined in claim 1, wherein providing a computer connected to the subscriber line;

the predetermined subscriber numbers and the information to be transmitted are stored in the computer; and the computer is used for the control of subscriber numbers and the information to be distributed.

6. Method as defined in claim 1, wherein the subscriber number of the subscriber line acting as source of information and the predetermined subscriber numbers are given in the information elements of a SETUP message in ISDN signalling.

7. Method as defined in claim 1, wherein the predetermined subscriber numbers and the information to be transmitted are stored in the telephone exchange by using its control commands.

8. Method as defined in claim 7, wherein said numbers and information are stored using an MML interface of the telephone exchange.

9. Method as defined in claim 1, wherein the transmission of information is activated at predetermined time intervals.

10. Method as defined in claim 1, wherein the information to be transmitted is presented in graphic or text format on the display of the terminal device or in the form of sound via a loudspeaker of the terminal device.

* * * * *